March 1, 1932. C. W. McKINLEY 1,847,251
TEMPERATURE COMPENSATOR FOR ELECTRIC MEASURING INSTRUMENTS
Filed Dec. 19, 1930
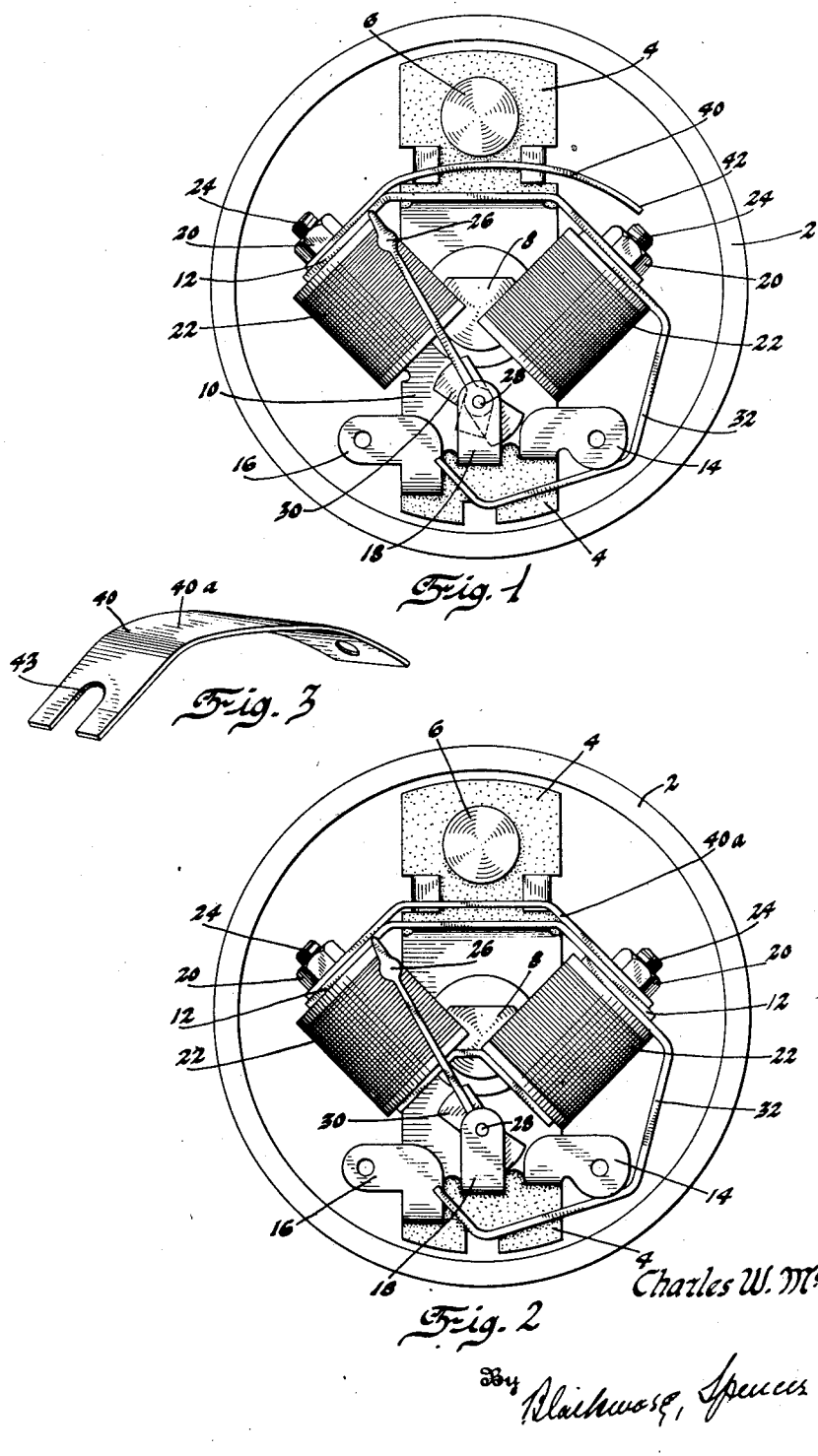

Patented Mar. 1, 1932

1,847,251

UNITED STATES PATENT OFFICE

CHARLES W. McKINLEY, OF FLINT, MICHIGAN, ASSIGNOR TO A C SPARK PLUG COMPANY, OF FLINT, MICHIGAN, A COMPANY OF MICHIGAN

TEMPERATURE COMPENSATOR FOR ELECTRIC MEASURING INSTRUMENTS

Application filed December 19, 1930. Serial No. 503,359.

This invention relates to electrical indicating instruments and has particular reference to a means for compensating for temperature changes.

In electric liquid level indicating systems used on automotive vehicles to determine the fuel level in the gasoline tank, it is customary to mount an electrical indicating instrument at the instrument board. In instruments of this kind it has been found that there is an error due to temperature. The resistance of the wire is increased with an increase in temperature so less current is passed. Also, the ability of the iron cores of the electromagnets to become magnetized decreases with an increase in temperature. To compensate for this change a piece of metal, having the characteristic that its permeability varies oppositely to that of iron, is used to connect the poles of the electromagnets or coils in such a manner as to secure a constant reading irrespective of the temperature of the coils. The alloy used may be nickel-steel, copper-nickel, et cetera.

On the drawings:

Figure 1 shows one form of the invention with the compensating metal applied.

Figure 2 is a view similar to Figure 1 showing a different form of compensating metal.

Figure 3 is a perspective view of the compensating metal shown in Figures 1 or 2.

Referring to the drawings, the numeral 2 indicates the casing of an electrical indicating instrument. In the casing there is mounted the base piece 4 provided with suitable terminals 6 and 8. On the base 4 there is mounted the frame 10 provided with the ears 12, 14, 16 and 18. On the ears 12 there is rigidly mounted by means of the nuts 20 the coils or electromagnets 22 only two of which are shown for purposes of illustration but it is obvious that any number may be used. The electromagnets are preferably arranged in fan shape or radially from the axis of the pointer. The cores of the electromagnets 22 project through the ear 12 as shown at 24 and are threaded to receive the nuts 20. The ears 14 and 16 are for the purpose of mounting the dial over which the pointer 26 swings. The pointer 26 is mounted on the shaft 28 pivoted between the ear 18 and the frame 10. The shaft 28 also has the armature 30 rigidly mounted thereon.

One of the coils is provided with an iron pole piece 32 which is rigidly secured at one end to the ear 12 by means of the nut 20. The other end of the pole piece 32 extends around to the other end of the electromagnet and is spaced therefrom to receive the armature and shaft 28 substantially midway between the end of the electromagnet and the end of the pole piece.

The invention resides in the use of the temperature compensator 40 which in the species shown in Figure 1 is rigidly attached by means of the core 24 and nut 20 to the ear 12 at one of the electromagnets. The end 42 of the compensating member is free and extends to substantially the axis of the other electromagnet 22, that is, at all times in the electrical field of both magnets. A suitable slot 43 (or an opening) is provided in the member 40 to receive the threaded end of the core 24.

In the species of Figure 2, the temperature compensating member 40a is positioned similarly to the member 40 in Figure 1 but is secured at both its ends to the ear 12 by means of the nuts 20 and cores 24.

I claim:

1. In an electric measuring instrument having a plurality of electromagnets arranged in fan shape or radiating from a common center and an armature influenced thereby, a magnetic temperature compensating member attached to one only of said magnets and extending adjacent the other magnet so as to affect all of the magnets.

2. In an electric measuring instrument having a plurality of electromagnets and an armature influenced thereby, a magnetic temperature compensating member attached to one of said magnets and extending around to the other electromagnets but not in contact therewith.

3. In an electric measuring instrument having a plurality of electromagnets and an armature influenced thereby, a magnetic temperature compensating member attached at its end to one of said magnets and extending toward the other magnet and positioned thereover so as simultaneously to affect both of said magnets, said member having a permeability which varies with temperature opposite to the core and coils of the magnets.

In testimony whereof I affix my signature.

CHARLES W. McKINLEY.